United States Patent [19]

Borsh

[11] Patent Number: 4,711,974
[45] Date of Patent: * Dec. 8, 1987

[54] ADAPTER FITTING FOR CONNECTING FLEXIBLE CONDUIT TO ELECTRICAL OUTLET BOXES

[75] Inventor: Richard J. Borsh, Chagrin Falls, Ohio

[73] Assignee: The Carlon Company, Cleveland, Ohio

[*] Notice: The portion of the term of this patent subsequent to Oct. 7, 2003 has been disclaimed.

[21] Appl. No.: 857,842

[22] Filed: Apr. 30, 1986

Related U.S. Application Data

[63] Continuation of Ser. No. 665,304, Oct. 26, 1984, Pat. No. 4,616,105.

[51] Int. Cl.[4] .............................................. F16L 3/02
[52] U.S. Cl. .................................... 174/65 R; 285/419
[58] Field of Search .............. 174/65 R, 65 G, 152 G; 248/56; 285/161, 419, 903

[56] References Cited

U.S. PATENT DOCUMENTS

| | | | |
|---|---|---|---|
| 1,835,155 | 12/1931 | Harbert | 248/56 |
| 2,361,816 | 10/1944 | Blanchard | 285/419 X |
| 4,248,459 | 2/1981 | Pate et al. | 285/419 X |
| 4,494,779 | 1/1985 | Neff et al. | 174/65 X |
| 4,578,528 | 3/1986 | Borsh et al. | 174/65 G |
| 4,616,105 | 10/1986 | Borsh | 174/65 R |

Primary Examiner—Arthur T. Grimley
Assistant Examiner—D. A. Tone
Attorney, Agent, or Firm—Laney, Dougherty, Hessin & Beavers

[57] ABSTRACT

An adapter fitting for connecting a corrugated flexible conduit to an electrical outlet box which includes a pair of substantially identical, semi-cylindrical cooperating fitting halves. Each fitting half carries a projecting, externally threaded neck portion, and the halves are joined by an internally threaded locking ring. A radially inwardly projecting corrugation engaging rib is provided on the inner side of each fitting half.

1 Claim, 5 Drawing Figures

ADAPTER FITTING FOR CONNECTING FLEXIBLE CONDUIT TO ELECTRICAL OUTLET BOXES

This is a continuation of co-pending application Ser. No. 665,304, filed on Oct. 26, 1984, now U.S. Pat. No. 4,616,105.

FIELD OF THE INVENTION

This invention relates to adapter fittings of the type which are used for connecting a tubular, flexible synthetic resin conduit, constituting a raceway for electrical conductors, to an electrical outlet box, junction box or the like.

BRIEF DESCRIPTION OF PRIOR ART

Many types of adapter fittings have been previously proposed and used for connecting flexible plastic conduit used as an electrical conductor raceway to an electrical outlet or junction box. Generally, such fittings will have a projecting portion which extends through an opening formed in the side wall of the box, and a conduit receiving portion which is outside the box and receives and engages an end of a flexible synthetic resin conduit.

In some type of adapter fittings, the fitting is retained in the box by a snap-engagement or press-fit connection which is facilitated by a characteristic resiliency of the fitting and the outlet box. Examples of this type of fitting are the fittings depicted and described in U.S. Pat. No. 2,420,826 to Irrgang and U.S. Pat. No. 4,192,477 to Decky et al.

In other types of adapter fittings, the adaptor carries a neck of reduced diameter which can be passed through the opening in the box, and then threadedly engaged by a ring or nut which locks the fitting to the box. Fittings of this type are illustrated in U.S. Pat. No. 4,248,459 to Pate et al; U.S. Pat. No. 804,204 to Brown; U.S. Pat. No. 1,835,155 to Harbert; U.S. Pat. No. 1,847,924 to Calderwood; U.S. Pat. No. 2,365,785 to Tinnerman; U.S. Pat. No. 2,505,312 to Wagner; U.S. Pat. No. 2,952,730 to Simonds and U.S. Pat. No. 4,140,869 to Carter.

BRIEF DESCRIPTION OF THE PRESENT INVENTION

The adapter fitting of the present invention is an easily usable connector which can be employed by electricians for quickly connecting a flexible corrugated electrical raceway conduit to an electrical outlet box.

Broadly described, the adaptor fitting of the invention is a generally cylindrical, tubular structure which carries a projecting neck portion of reduced external diameter at one end, and a portion of enlarged external diameter at its other end. The fitting is made up of a pair of substantially identical semi-cylindrical cooperating fitting halves. Each of the fitting halves carries a projecting neck portion which is externally threaded. The assembled adaptor fitting places the two halves in a cylindrical operative configurationn, and the two halves are joined by an internally threaded locking ring which is threaded over, and into engagement with, the externally threaded neck portions.

Each fitting half carries at least one radially inwardly projecting, circumferentially extending rib around the inner side of the fitting half, and these ribs are adapted, by their dimension and location, to engage one or more of the corrugations on a corrugated electrical conduit which, upon assembly, is inserted between and engaged by the two fitting halves.

An important object of the invention is to provide an adapter fitting which can be quickly and easily used to mount a corrugated flexible synthetic resin conduit to an electrical outlet box.

Another object of the invention is to provide an adapter fitting useful in connecting tubular conduits to electrical outlet boxes, which fitting is made in two separable parts which are not finally joined until the connection of the electrical conduit to the box is to be achieved.

A further object of the invention is to provide an adapter fitting which can be used to connect a flexible plastic conduit to an electrical outlet box in such a way that the distance which the conduit extends toward, or into, the electrical outlet box can be selectively determined by the electrician in the course of assembling the adapter fitting, conduit and box.

A further object of the invention is to provide an adapter fitting for connecting a tubular flexible conduit to an electrical outlet box, which fitting is versatile in its use so as to permit sharp, low radius bends to be achieved by electrical conductors passed through the plastic conduit, through the adapter fitting and into the interior of an electrical outlet box.

Additional objects and advantages of the present invention will be perceived and understood as the following detailed description of a preferred embodiment of the invention is read conjunction with the accompanying drawings which illustrate such preferred embodiment.

BROAD DESCRIPTION OF THE DRAWINGS

DETAILED DESCRIPTION OF A PREFERRED EMBODIMENT OF THE INVENTION

Figure 1:
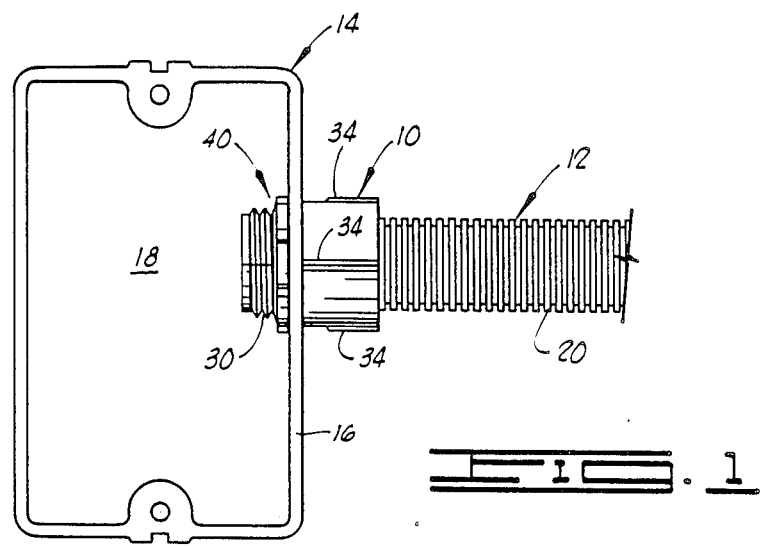
FIG. 1 is a front elevation view illustrating the adapter fitting of the invention as it is in use for connecting a corrugated synthetic resin conduit to an electrical outlet box.

Referring initially to FIG. 1 of the drawings, the adapter fitting of the present invention is designated generally by reference numeral 10 and is illustrated as it is used for connecting a corrugated, synthetic resin conduit 12 to an electrical outlet box 14. The electrical outlet box 14 illustrated in the drawings is a typical electrical outlet box having one or a plurality of side walls 16, and other types of outlet bores may depart substantially from the precise form here illustrated for purposes of discussion only. The electrical outlet box 14 may be described as including a hollow interior 18 into which it is desired to lead electrical conductors (not shown) passed through the corrugated synthetic resin conduit 12 and the adapter fitting 10.

The corrugated synthetic resin conduit 12 is also merely representative of various forms of this type of conduit which can be used in accordance with the principles of the invention. The illustrated example of such a conduit includes a plurality of external corrugations 20 which are defined by a series of contiguous ridges and troughs or grooves. The conduit 12 further includes an end portion 22 from which a plurality of electrical conductors, not shown, emerge and pass into the interior of the electrical outlet box 14.

Figure 2:
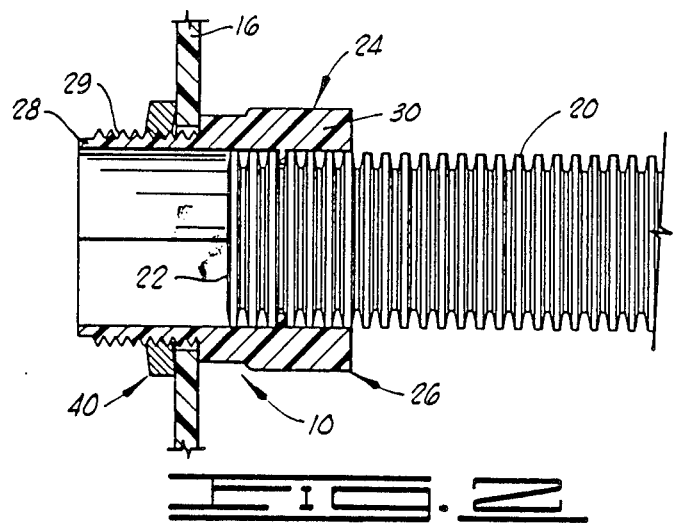
FIG. 2 is a longitudinal sectional view taken longitudinally through the center of the adapter fitting of the invention, and through the wall of an electrical outlet box to which it is connected. A corrugated flexible synthetic resin conduit, engaged by the adapter fitting, is illustrated in elevation.
Figures 3, 4, 5:
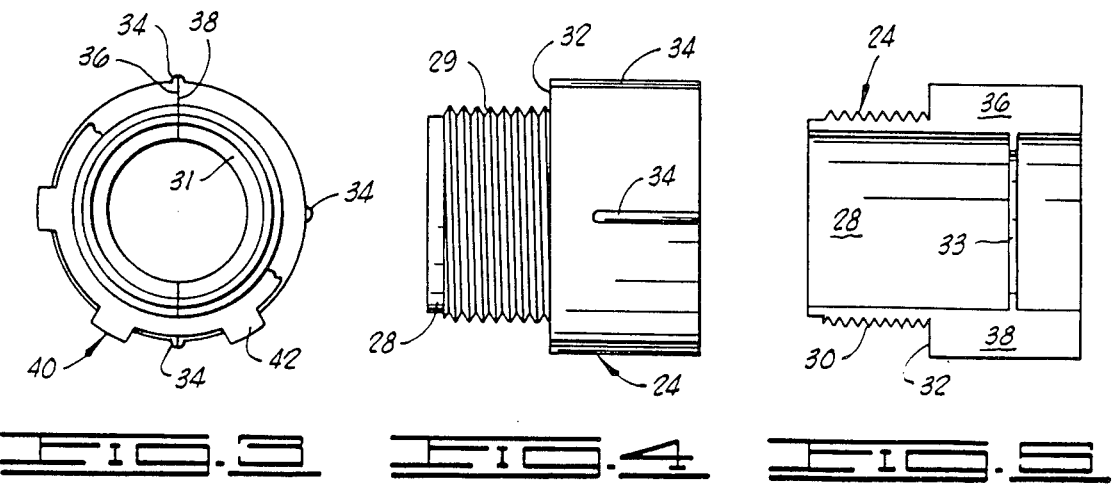
FIG. 3 is an end view of the adapter fitting as it appears when viewed from inside the electrical box to which it is connected, and having a portion of a locking ring forming a part of the adapter fitting broken away.
FIG. 4 is a side elevation view of the adapter fitting of the invention as it appears when the adapter fitting is rotated through 90° from the position of the adapter fitting viewed in FIG. 1.
FIG. 5 is a side elevation view of one of the fitting halves employed in the adapter fitting of the invention.

The details of construction of the adapter fitting 10 of the present invention are best illustrated in FIGS. 2, 3 and 5. The fitting 10 includes a pair of substantially identically semi-cylindrical fitting halves 24 and 26. The semi-cylindrical fitting halves 24 and 26 are, of course, complementary in configuration, and can be joined to form a tubular element which receives an end portion of the conduit 12. Each of the fitting halves 24 and 26 includes an axially projecting neck portion 28 which extends from approximately the middle of the fitting to one end thereof. The neck portion 28 carries an external, circumferentially extending thread 29.

From the neck portion 28 to the other end of the respective fitting half 24 or 26, each fitting half further includes an integrally formed conduit-receiving portion 30. The conduit-receiving portion 30 of each of the fitting halves is of relatively larger external diameter than the neck portion 28 to which it is joined, and thus forms, at its junction with the neck portion, a radially outwardly extending shoulder 32. In observing the drawings, it will be noted that each of the semi-cylindrical fitting halves may be described as including a concave outer side and a concave inner side. The concave inner sides of the two fitting halves 24 and 26 cooperate to form a smooth walled, even diameter bore extending completely through the adapter fitting from one end thereof to the other. A radially inwardly projecting, circumferentially extending rib 33 is carried on the concave inner side of the conduit-receiving portion of each fitting half.

Carried on the external surface of the relatively large diameter conduit-receiving portion 30 of each of the fitting halves are a plurality of axially extending, circumferentially spaced ribs 34. The axially extending ribs 34 are spaced at about 90° from each other around the respective fitting halves. Thus, each of the fitting halves 24 and 26 includes a pair of opposed, axially extending side edges 36 and 38, as shown in FIG. 5, and it will be noted in referring to FIGS. 3 and 4 that a pair of the axially extending ribs 34 are located immediately adjacent the side edges 36 and 38, and form therewith a relatively broad stabilizing and tracking surface as perhaps best illustrated in FIGS. 3 and 5.

Interiorly of the box 14, the semi-cylindrical fitting halves 24 and 26 are joined to each other and locked to the box by a locking ring 40. The locking ring 40 is a rigid annular element which carries internal threads adapted to threadedly engage the threads 29 carried on the neck portions 28 of the two fitting halves. The locking ring 40 carries a plurality of circumferentially spaced, axially extending biting lugs 42. The biting lugs 42 extend in an axial direction toward the side wall 16 of the box 14, and when the locking ring 40 has been threaded against the wall of the box, the biting lugs function to impale the wall of the box and prevent the locking ring from becoming loosened. It will be perceived that the function of the locking ring 40 is that of locking the adapter fitting to the side wall 16 of the box 14, and also retaining the two semi-cylindrical fitting halves 24 and 26 in a tubular or cylindrical array suitable for receiving the flexible conduit 12.

In using the adapter fitting of the invention, the two semi-cylindrical fitting halves 24 and 26 are first placed around the end portion of the corrugated conduit 12. In doing this, the side edges 36 and 38 are abutted against each other so that the two semi-cylindrical halves form a tubular, generally cylindrical element. The fitting halves 24 and 26, when so oriented relative to the conduit 12, provide a positive interlock with the conduit as the radially inwardly projecting ribs 33 extend into the trough between adjacent corrugations carried on the conduit.

It should be noted that the distance that the conduit 12 extends into the adapter fitting 10 can be selectively adjusted. In fact, it may be desirable in some instances that the conduit 12 extend all the way through the adapter fitting 10 and into the interior of the box 14. This, too, can be easily accomplished by simply engaging the radially inwardly extending ribs 33 with a trough which is spaced relatively further in an axial direction from the end 22 of the conduit 12 so as to provide the described arrangement.

After the semi-cylindrical fitting halves 24 and 26 have been positioned around the conduit 12 in the manner described, the end portion of the fitting 10 which carries the projecting neck portions 28 of each of the two fitting halves 24 and 26 is inserted through the opening formed in the wall 16 of the box 14. While the semi-cylindrical fitting halves 24 and 26 are held about the conduit 12 in the position described, the rigid locking ring 40 is then threaded onto the external threads 29 carried on the outer side of the each of the projecting neck portions 28. When the locking ring 40 has been rotated until it is tight against the inner side of the wall 16 of the box 14, the fitting halves 24 and 26 can be manually released and the assembly is completed. At this time, the biting lugs 42 carried on the locking ring 40 bite into the material of construction of the wall 16 of the box. In most instances this will be a synthetic resin construction, and the engagement is such that reverse rotation of the locking ring is prevented.

On some occasions, it may be desirable to axially stagger or offset the fitting halves 24 and 26 in relation to each other so that the ends of the fitting halves are not aligned. For example, where a very sharp bend must be made by electrical conductors after entering the outlet box 14, it may be desirable to set the internal end carried on the neck portion 28 of one of the two fitting halves 24 or 26 out further toward the wall 16 of the box while retaining the other fitting half at its fully inward, fully seated position as shown in FIG. 2 of the drawings. Such axial offset is facilitated by the sliding and guidance function afforded by the side edges 36 and 38 in conjunction with the contiguous, axially extending ribs 34 which broaden this surface at these side edges.

Although a preferred embodiment of the invention has been herein illustrated and described in order to afford an understanding of the operating principles upon which this invention is based, it will be understood that various modifications and changes in the form of such preferred embodiment can be effected without departure from the basic principles of operation.

Changes and innovations of that type are therefore deemed to be circumscribed within the spirit and scope of the invention except as the same may be necessarily limited by the appended claims, or reasonable equivalents thereof.

What is claimed is:

1. An electrical conductor protective system comprising, in combination:

an electrical outlet box having at least one side wall defining a substantially circular opening through the one side wall and into the interior of the box;

an adapter fitting projecting through the circular opening through the side wall of the box and interlocked with said side wall, said adapter fitting including:

a pair of semi-cylindrical fitting halves each having a concave inner side and a convex outer side, and having a first end and having a second end, each of said two fitting halves further including:

a neck portion terminating at said first end and extending through the circular opening in the side wall of the box;

means preventing the neck portion from moving through said opening beyond a certain specific degree of passage therethrough;

a conduit-receiving portion extending from said neck portion to the second end of said fitting half, and having an external surface of greater diameter than the external diameter of said neck portion;

a pair of opposed, axially extending, substantially monoplanar, smooth, parallel, uninterrupted side edges extending from the first end thereof to the second end thereof, said side edges in each of said pairs lying in a common plane and slidingly abutting the pair of side edges of the other of said fitting halves whereby said semi-cylindrical fitting halves may be slid axially relative to each other as said opposed side edges slide against each other to thereby axially offset one of the fitting halves relative to the other and thereby cause said neck portion of one said semi-cylindrical fitting halves to project a shorter distance into said electrical outlet box than the other of said neck portions projects thereinto to facilitate connecting electrical conductors to terminals within said electrical outlet box;

a radially inwardly projecting, circumferentially extending rib carried on the concave inner side of the respective fitting half; and a flexible, synthetic resin corrugated conduit including a plurality of contiguous circular ridges each separated from the two adjacent circular ridges by a pair of grooves, at least one of said grooves receiving one of said radially inwardly projecting ribs to retain said corrugated conduit interlocked with said adapter fitting in a preselected position relative to said box.

* * * * *